United States Patent [19]

Reuther

[11] Patent Number: 5,242,694
[45] Date of Patent: Sep. 7, 1993

[54] PROCESS FOR BREWING LOW CARBOHYDRATE NEAR BEER

[75] Inventor: Hans Reuther, La Crosse, Wis.

[73] Assignee: G. Heileman Brewing Company, Inc., La Crosse, Wis.

[21] Appl. No.: 836,240

[22] Filed: Feb. 18, 1992

[51] Int. Cl.$^5$ .............................................. C12C 11/04
[52] U.S. Cl. ........................................ 426/16; 426/11; 426/29; 426/592
[58] Field of Search ................. 426/11, 12, 16, 29, 426/13, 14, 600, 28, 592, 477

[56] References Cited

U.S. PATENT DOCUMENTS

| | | | |
|---|---|---|---|
| 4,138,499 | 2/1979 | Strauss et al. | 426/16 |
| 4,272,552 | 6/1981 | Zastrow | 426/13 |
| 4,528,198 | 7/1985 | Mizerak | 426/16 |
| 4,837,034 | 6/1989 | Owades | 426/16 |
| 4,970,082 | 11/1990 | Huige et al. | 426/16 |

OTHER PUBLICATIONS

Pollock, J. R. A., Brewing Science, vol. 1, 1979, pp. ix–xiii, Academic Press, London.
Broderick, H. M., The Practical Brewer, a Manual for the Brewing Industry, 1977, pp. v, vi, Master Brewers Association of the Americas, Wisconsin.

Primary Examiner—Joseph Golian
Assistant Examiner—Leslie Wong

[57] ABSTRACT

A low carbohydrate near beer is produced by a brewing process utilizing brewing materials including 100% brewer's malt with not more than a prescribed amount of dextrin malt and not more than a prescribed amount of caramel malt. The mashing, boiling and fermentation stages are controlled so that carbohydrate and calorie levels are achieved in a near beer having excellent taste and brightness.

3 Claims, 1 Drawing Sheet

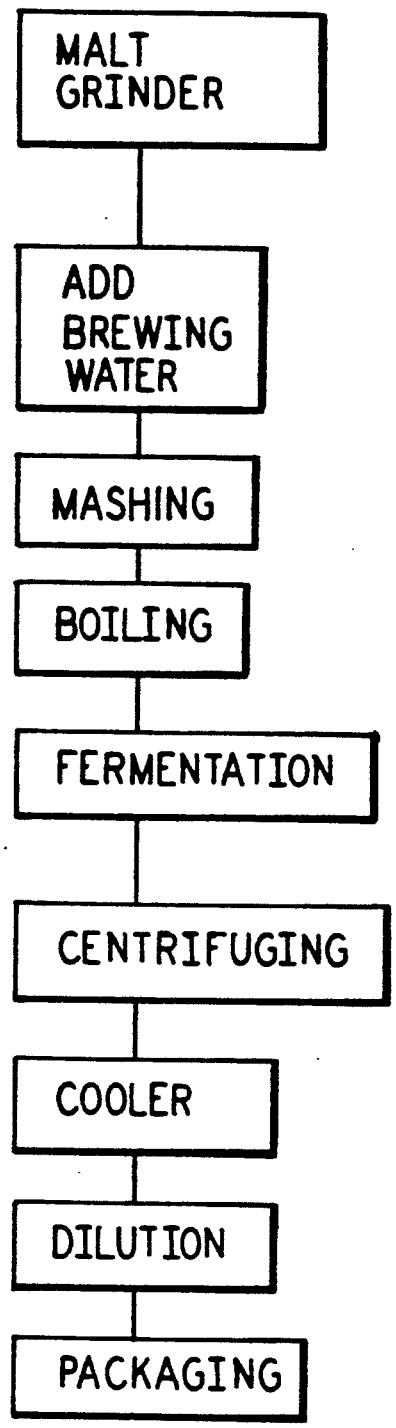

PROCESS FOR BREWING LOW CARBOHYDRATE NEAR BEER

BACKGROUND OF THE INVENTION

1. Field of the Invention

This invention relates generally to the brewing of beer and more particularly relates to a process for brewing low carbohydrate near beer and the near beer product produced by the practice of such process.

2. Description of the Prior Art

Brewing is the preparation of beer from carbohydrate material, chiefly malted barley, by means of the action of yeast and usually with the addition of hops. Brewing seems to have originated in Babylon, where, as in Egypt, barley grew wild and there is some evidence that beer made from malted grain was being brewed in Mesopotamia by 6000 B.C.

The principal materials employed are malted barley, hops, water and yeast. In certain countries, e.g., Germany, the use of other materials is forbidden by law, except for export beers, but in most places other materials are employed to give color and flavor and are known as "adjuncts".

With the increased interest in health and health related food and beverages, the advent of non-alcoholic and low alcohol beers has created the need for an improved low carbohydrate near beer which has an enhanced appearance and flavor.

SUMMARY OF THE INVENTION

The product of the present invention and produced by the process of the present invention is a non-adjunct, malt and fermented beverage containing less than 0.5% alcohol by volume, a near beer by the standards of the Bureau of Alcohol, Tobacco and Firearms (BATF).

100% brewer's malt used with not more than 7.5% dextrin malt and not more than 7.5% 60 lovibond caramel malt results in a color of 3.0 degrees Standard Reference Method (SRM) [standards of the American Society of Brewing Chemists (ASBC)]. European-type tettnang hops grown in the United States are used for bittering and flavor.

In practicing the process of the present invention, a multi-temperature and rest mash regime is used. Acidified water is utilized and a controlled timed boil is used to provide protein coagulation and sulfide removal. Hops are added and the wort aerated.

Yeast is added to the wort, fermentation is ended by centrifugation, whereupon the beer is cooled and volatile compounds flushed. The product is stored under refrigeration and silica gel treatment is used to enhance colloidal stability. Carbonated water is used to achieve the target alcohol level of 0.5% by volume.

BRIEF DESCRIPTION OF THE DRAWINGS

The single FIGURE of the drawings constitutes a block diagram showing the mashing, boiling and fermentation stages of the process as augmented and supplemented in accordance with various steps practiced in following the principles of the present invention.

DESCRIPTION OF THE PREFERRED EMBODIMENTS

In selecting the brewing materials in accordance with the principles of the present invention, it is contemplated that there be used one hundred percent (100%) brewer's malt with not more than seven point five percent (7.5%) dextrin malt and not more than seven point five percent (7.5%) sixty (60) Lovibond caramel malt resulting in a color of three degrees (3°) SRM. European type tettnang hops are used.

The three main stages of the brewing process are: (1) mashing, (2) boiling, and (3) fermentation.

The principal reaction in the mashing stage is the breakdown of the insoluble starch in the endosperm of the malted barley. It is converted into soluble maltose and other sugars and dextrins by the amylolytic enzymes which are present in the malt.

As contemplated by the present invention, the mashing stage is conducted in the form of a multi-temperature and rest mash regime which is used in such a manner as to produce carbohydrate levels at or below eight point five (8.5) grams per twelve (12) fluid ounces, and calories not exceeding forty five (45) kilocalories per twelve (12) fluid ounces.

In order to provide a proper brewing water, a brewing water is utilized which is adequately acidified to provide a final beer pH of not less than four point six five (4.65). It will be understood that the "pH value" is an arbitrary symbol adopted to express the degree of acidity or alkalinity of a solution. It is the logarithm of the reciprocal of the hydrogen-ion concentration, in gram mols per liter at seventy one point six degrees Fahrenheit (71.6° F.). A pH of seven (7) represents a neutral solution, lower values represents acidity, higher values alkalinity.

Prior to mashing, the malt is crushed to somewhat separate the flour from the husks, thereby producing grist which is mixed with brewing water to form a porridgelike mixture called wort.

In a so-called three-mash system, preliminary mashing of the wort occurs at a first temperature, say 100° F., whereupon the temperature of the mash is raised in three stages: first to the optimum temperature for the activity of the proteolytic enzymes at a higher selected temperature range of say 120° to 130° F., secondly to a still higher temperature, say 150° F. and lastly to 168° F.

The first of these steps may last for a defined period of time, say two hours, and is known as the "protein rest." Quick mashing systems may be used wherein only two mashing stages are utilized at higher temperatures, say 145° F. and 172° F.

After the mashing stage is completed, and sometimes after a filtering step, the wort enters a boiling stage, which takes place in a copper tank or kettle. "Boiling" prevents any further enzyme action and coagulates a great deal of the protein material, which is known as the hot break or trub. Boiling also sterilizes the wort, makes it more concentrated and provides an opportunity for the addition of hops.

In accordance with the present invention, a minimum sixty (60) minute boil insures adequate protein coagulation and effective dimethyl sulfide (DMS) removal. During the course of the boil, hops may be added selectively. It is contemplated by the present invention that European type tettnang hops grown in the United States will be employed and such hops are added in such amount that the final bitterness units (BU, ASBC standards) range from five (5) to ten (10).

The wort is aerated so that it exhibits six (6) parts per million dissolved oxygen. After boiling, the wort is filtered to remove the hops and also as much of the hot break as possible.

The third stage, or fermentation stage, begins when the yeast is "pitched" into the wort. In accordance with this invention, yeast is added to the wort to provide thirteen (13) to seventeen (17) million viable cells per milliliter. Fermentation continues for a period of twenty four (24) to thirty two (32) hours and fermentation temperatures are maintained within a range of from about fifty-three (53) °F. to fifty-six (56) °F.

The fermentation stage is ended by centrifugation of the wort, resulting in a real degree of fermentation in the order of from about twenty two percent (22%) to twenty four (24%). The centrifugation will have the effect of reducing the suspended yeast cell count to less than fifty thousand (50,000) cells per milliliter. It is important to insure that the oxygen pick-up during centrifugation not exceed two one hundredths (0.02) parts per million, in order to avoid undesirable oxygenation of the wort. The centrifuging action has the effect of clarifying the wort and prepares the wort for entering a cooler.

The wort is cooled, preferably to a level of twenty nine (29) °F. In order to flush volatile compounds from the wort, the cooled wort is carbon dioxide washed enroute to storage so that DMS levels do not exceed thirty five (35) parts per billion. The wort is then held in storage at twenty nine (29) °F. for at least four (4) days.

Silica gel treatment is used to enhance colloidal stability, a procedure which consists of injecting silica gel into the wort for the purpose of absorbing protein, thereby improving and increasing the brightness of the beer product. The product is diluted with deaerated, carbonated water in order to achieve the targeted alcoholic level of 0.5% by volume. Adequate pasteurization is utilized so that the finished product exhibits a level of thirty (30) to thirty-five (35) pasteurization units [PU, ASBC standards, one (1) minute exposure at one hundred forty (140) °F.].

It will be understood that in order to minimize the risk of oxygenation of the product, all process transfers and the final packaging should be conducted in such a manner as to avoid pulling air into the system and elevating the air levels.

By following the process described above and utilizing the steps of the process in the sequence and with the values specified and within the parameters defined, there is produced a low carbohydrate near beer of unusually good flavor and with a pleasing coloration of three (3) degrees SRM and with excellent brightness characteristics.

Although minor modifications might be suggested by those versed in the art, it should be understood that I wish to embody within the scope of the patent warranted hereon all such modifications as reasonably and properly come within the scope of my contribution to the art.

I claim as my invention:

1. A process of making a low carbohydrate near beer with an alcohol level of below 0.5% by volume which comprises the steps of:
    blending brewing materials which include 100% brewer's malt containing not more than 7.5% dextrin malt and not more than 7.5% 60 Standard Reference Method caramel malt to enhance flavor and taste and to produce a color above 3° Standard Reference Method;
    mashing the blended malt materials to produce a wort having carbohydrate levels at or below 8.5 grams per 12 fluid ounces and calories not exceeding 45 kilocalories per 12 fluid ounces;
    boiling the wort for a minimum of 60 minutes to provide protein coagulation and dimethyl sulfide removal;
    adding yeast to the wort to provide 13-17 million yeast cells per milliliter to initiate fermentation and fermenting the wort at temperatures in the range of 53° F. to 56° F. for a period of 24 to 32 hours;
    ending the fermentation by centrifuging the wort resulting in a real degree of fermentation of 22 to 24% and decreasing the suspended yeast cell count to less than 50,000 cells per milliliter;
    cooling the wort to 29° F.;
    carbon dioxide washing the wort to flush out volatile compounds to dimethyl sulfide levels not exceeding 35 parts per billion;
    adding European type tettnang hops such that the final bitterness units range from 5 to 10 bitterness units measured in ASBC standards;
    holding the wort in storage for a period of at least 4 days;
    subjecting the stored wort to silica gel treatment to enhance colloidal stability and to remove protein compounds to maintain chemical shelf life; and
    diluting the product with deaerated, carbonated water to an alcohol level of less than 0.5% by volume;
thereby to produce a low carbohydrate near beer having a real degree of fermentation of below 24%.

2. The process of claim 1, wherein the malt is first formed into a grist which is then mixed with brewing water adequately acidified to provide a final beer pH of not less than 4.65.

3. The process of claim 1, wherein the product is pasteurized to achieve a level of 30 to 35 pasteurization units measured by ASBC standards.

* * * * *